(12) United States Patent
Pascale et al.

(10) Patent No.: US 11,314,688 B2
(45) Date of Patent: Apr. 26, 2022

(54) PROVIDING ACCESS TO TRANSFORMED USER DATA TO MAINTAIN USER PRIVACY

(71) Applicant: salesforce.com, inc., San Francisco, CA (US)

(72) Inventors: Gregory Thomas Pascale, Seattle, WA (US); Scott Thurston Rickard, Jr., Bellevue, WA (US); Gary William Flake, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 80 days.

(21) Appl. No.: 15/339,344

(22) Filed: Oct. 31, 2016

(65) Prior Publication Data

US 2018/0121447 A1     May 3, 2018

(51) Int. Cl.
```
G06F 16/11    (2019.01)
G06F 16/25    (2019.01)
G06F 16/22    (2019.01)
G06F 21/62    (2013.01)
G06F 21/60    (2013.01)
```

(52) U.S. Cl.
CPC ........ *G06F 16/122* (2019.01); *G06F 16/2255* (2019.01); *G06F 16/258* (2019.01); *G06F 21/604* (2013.01); *G06F 21/6245* (2013.01); *G06F 21/6254* (2013.01)

(58) Field of Classification Search
CPC .......... G06F 17/30082; G06F 17/3022; G06F 17/30569; G06F 21/604; G06F 21/6245; G06F 21/6254
USPC ....................................................... 707/694
See application file for complete search history.

(56) References Cited

U.S. PATENT DOCUMENTS

| | | | | |
|---|---|---|---|---|
| 2010/0132044 A1* | 5/2010 | Kogan | ................ | G06F 21/6245 726/26 |
| 2010/0241641 A1* | 9/2010 | Byun | ................. | G06F 21/6227 707/757 |

(Continued)

FOREIGN PATENT DOCUMENTS

| | | |
|---|---|---|
| JP | 2007-164266 A | 6/2007 |
| JP | 2011-128796 A | 6/2011 |
| JP | 2016-045934 A | 4/2016 |

OTHER PUBLICATIONS

Ganz, Nicole, "Data Anonymization and its Effect on Personal Privacy", May 2015, School of Business, University at Albany, State University of New York, pp. 1-22 (Year: 2015).*

(Continued)

*Primary Examiner* — Shahid A Alam
(74) *Attorney, Agent, or Firm* — Fenwick & West LLP

(57) ABSTRACT

A service system provides users with access to online services. As part of providing the services to users, the service system stores data for users in a data storage system. When the service system receives a request from an administrator of the system for user data stored in the data storage system, the service system identifies the data requested by the administrator. The service system also determines policies that apply to the data. The determined policies indicate transformations that are to be performed on the data to protect the privacy of the users. The service system transforms the user data as indicated by the policies and provides the transformed user data to the administrator.

15 Claims, 5 Drawing Sheets

(56) References Cited

U.S. PATENT DOCUMENTS

| | | | | |
|---|---|---|---|---|
| 2012/0221955 | A1* | 8/2012 | Raleigh | H04L 12/1485 715/736 |
| 2012/0233129 | A1 | 9/2012 | Brinkmoeller et al. | |
| 2012/0246696 | A1 | 9/2012 | Boukobza | |
| 2014/0032259 | A1* | 1/2014 | LaFever | G06Q 30/0271 705/7.29 |
| 2014/0172854 | A1* | 6/2014 | Huang | G06F 21/6245 707/737 |
| 2014/0331338 | A1* | 11/2014 | Serita | H04L 63/10 726/30 |
| 2015/0007249 | A1* | 1/2015 | Bezzi | G06F 21/6227 726/1 |
| 2015/0089357 | A1* | 3/2015 | Vandervort | G06F 21/62 715/256 |
| 2016/0140190 | A1* | 5/2016 | Moncrieff | G06F 16/248 707/722 |
| 2016/0342812 | A1* | 11/2016 | Lynch | G06F 21/6254 |
| 2017/0039387 | A1* | 2/2017 | Leonardi | G06F 21/6245 |
| 2017/0171214 | A1* | 6/2017 | Anderson | G06F 17/30339 |
| 2018/0032758 | A1* | 2/2018 | Wang | G06F 21/6254 |

OTHER PUBLICATIONS

PCT International Search Report and Written Opinion, PCT Application No. PCT/IB2017/056778, dated Feb. 7, 2018, 11 pages.
Japan Patent Office, Notice of Reasons for Rejection, JP Patent Application No. 2019-516633, dated Mar. 24, 2020, ten pages.
European Patent Office, Office Action, EP Patent Application No. 17804662.9, dated May 7, 2021, six pages.

* cited by examiner

PROVIDING ACCESS TO TRANSFORMED USER DATA TO MAINTAIN USER PRIVACY

BACKGROUND

Field of the Embodiments

Described embodiments pertain in general to databases, and in particular to providing access to user data in way that protects the privacy of users.

Description of the Related Art

Entities develop software for providing services to users (e.g., via the Internet). As part of providing services to users, the entities typically store data for their users. For example, if an entity provides a cloud based service to users, the entity will typically store data for a user so that other users or the same user can access the data at a later time and/or from different locations.

Entities take different approaches as to how they handle user data. Some entities take the approach of being able to analyze user data for purposes of improving their software. While this approach allows users to have an improved experience through improved software, to some users this approach is unacceptable because their data is not maintained private. Other entities have very restrictive policies where an entity will not analyze user data as part of respecting the privacy of their users. However, this approach makes it difficult for the entity to obtain the data that is necessary to innovate and improve their software.

SUMMARY

The embodiments described herein provide methods, computer program products, and computer database systems for allowing administrators of a service system to access user data in a way that protects the privacy of users. A service system provides users with access to online services. For example, the service system may be a web-based customer relationship management (CRM) system that provides employees of an enterprise with access to CRM software applications. As part of providing the services to users, the service system stores in a data storage system data provided by users and data generated by users through interactions with the service system.

Users can access the data that they store with the data storage system. However, administrators of the service system (e.g., developers) may also wish to access user data for purposes of improving the services that they provide to users. For example, continuing with the example of the service system being a CRM system, developers of the system may wish to access user data to analyze how users interact with CRM software applications and determine how they can improve the functionality of the applications. The service system allows administrators to access user data in a way that protects the privacy of users.

To protect the privacy of users, when the service system receives a request from an administrator for user data stored in the data storage system, the service system identifies the data requested by the administrator. The service system also determines policies that apply to the data. The determined policies indicate transformations that are to be performed on the data to maintain user privacy. The service system transforms the user data as indicated by the policies and provides the transformed user data to the administrator.

As an example, assume the data requested by the administrator is data for multiple sales opportunities. The sales opportunities each include a sales amount. Based on an applicable policy, the service system identifies the highest sales amount from the multiple sales opportunities and transforms the sales amount of each opportunity by dividing the sales amount by the highest sales amount from the multiple opportunities. Hence, the administrator will not know the specific amount of a sales opportunity. However, the administrator will know how the amount of one opportunity compares to the other opportunities which may be valuable to the administrator in identifying ways to improve the services provided by the service system.

Thus, the service system is able to protect the privacy of users by not providing specific details of certain user information, but still provides administrators with sufficient information that can be used by the administrators to improve the services of the service system. The features and advantages described in this summary and the following detailed description are not all-inclusive. Many additional features and advantages will be apparent to one of ordinary skill in the art in view of the drawings, specification, and claims hereof.

Figure 1:
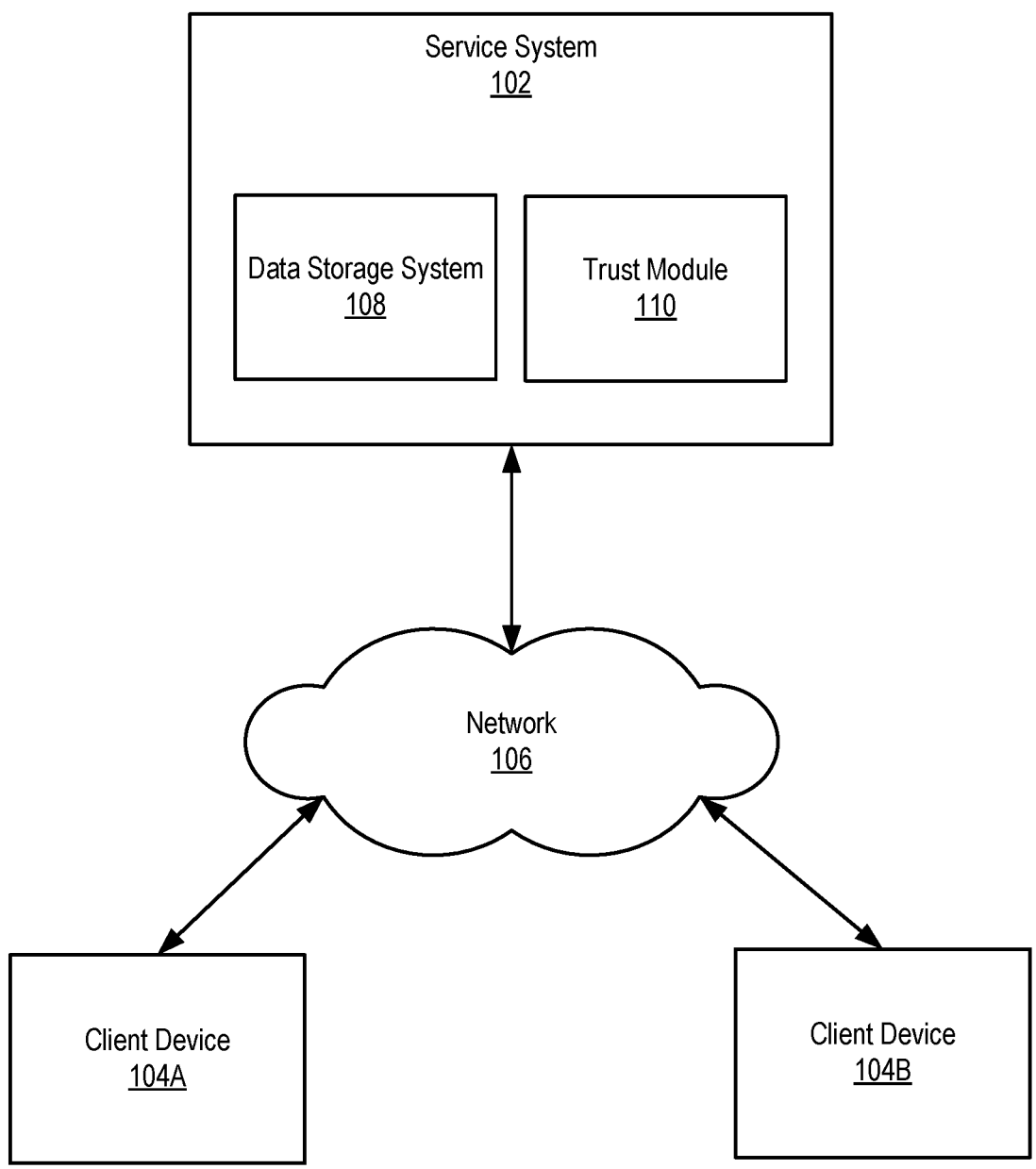
FIG. 1 is a block diagram of a service system environment according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "108A," indicates that the text refers specifically to the element having that particular reference numeral. A reference numeral in the text without a following letter, such as "108," refers to any or all of the elements in the figures bearing that reference numeral.

DETAILED DESCRIPTION

FIG. 1 is a block diagram of a service system environment 100 according to one embodiment. FIG. 1 illustrates a service system 102 and client devices 104A and 104B connected via a network 106. Although a select number of each entity are shown in FIG. 1, embodiments can have more or less of each entity (e.g., additional client devices 104).

The service system 102 is a computer system that provides services to users. The service system 102 may also be referred to as a service database system 102. In one embodiment, the service system 102 implements a web-based customer relationship management (CRM) system that provides users with CRM services. For example, in one embodiment, the online system 100 includes application servers configured to implement and execute CRM software applications as well as provide related data, code, forms, webpages and other information to and from client devices 104 and to store, and retrieve, data, objects, and webpage content. In other embodiments, the service system 102, provides other services or additional services that may include one or more of the following types of services: social networking, shopping, online searching, advertising, data storage, news distribution, payment processing, banking, and so forth.

The service system 102 includes a data storage system 108 and a trust module 110. The data storage system 108 stores data provided by users to the service system 102 for storage and data generated by users through interactions with the service system 102. The data stored by the data storage system 108 may generally be referred to as "user data" herein.

In one embodiment, the service system 102 is a multi-tenant system and the data storage system 108 stores data for multiple tenants. Each tenant may be an enterprise as described herein and the users that store data in the data storage system 108 are associated with one of the enterprises (e.g., employees, contractors, or other representatives of an enterprise). For example, one tenant might be a company that employs a sales force where each salesperson communicates with the service system 102 to manage their sales process. Thus, a user might store in the data storage system 108 contacts, leads data, sales opportunities, customer follow-up data, performance data, goals, progress data, calendar entries, tasks, documents, social information, etc., all applicable to the user's personal sales process.

The trust module 110 processes requests by administrators for users data stored in the data storage system 108. An administrator may request user data from the service system 102 for purposes of analyzing the data and identifying ways to improve the services provided by the service system 102. As an example, an administrator may be a developer and the developer may request user data to identify trends in the data and improve the functionality of software used by users through the service system 102.

The trust module 110 allows administrators to access user data while at the same time ensuring that the privacy of users is respected. The trust module 110 maintains multiple policies. Each policy indicates specific data to which the policy applies and one or more transformation that are to be applied to the data. When the trust module 110 receives a request by an administrator for user data stored in the data storage system 108, the trust module 110 identifies the requested user data. The trust module 110 determines which of the policies apply to the user data. The trust module 110 applies to the user data the transformations indicated by the applicable policies. After the transformations of the applicable policies have been applied to the user data, the trust module 110 transmits the transformed user data to the client device 104 of the user. Further, details as to the functionality of the trust module 110 are provided below with reference to FIG. 2.

A client device 104 is a device used by a user or an administrator to communicate with the service system 102. A client device 104 may be, for example, a desktop computer, laptop, smart phone, tablet computer, or personal digital assistant (PDA). A user communicates with the service system 102 through a client device 104 to use the services provided by the service system 102. In the embodiment where the service system 102 stores data for an enterprise, a user may be, for example, an employee, a contractor, or any representative of an enterprise. An administrator communicates with the service system 102 through a client device 104 to gather user data, for example, for purposes of improving the services provided by the service system 102. An administrator has rights to perform functions on behalf of the entity that operates the service system 102. An administrator may be, for example, a developer that has authorization to modify software used by the service system 102 to provide services to users.

The network 106 represents the communication pathways between the service system 102 and client devices 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

Although the FIG. 1 illustrates a single network 106, the network 106 may comprise multiple networks. For example, client devices 104 of administrators may communicate with the service system 102 through a private enterprise network. On the other hand, users communicate with the service system 102 through a public network.

The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
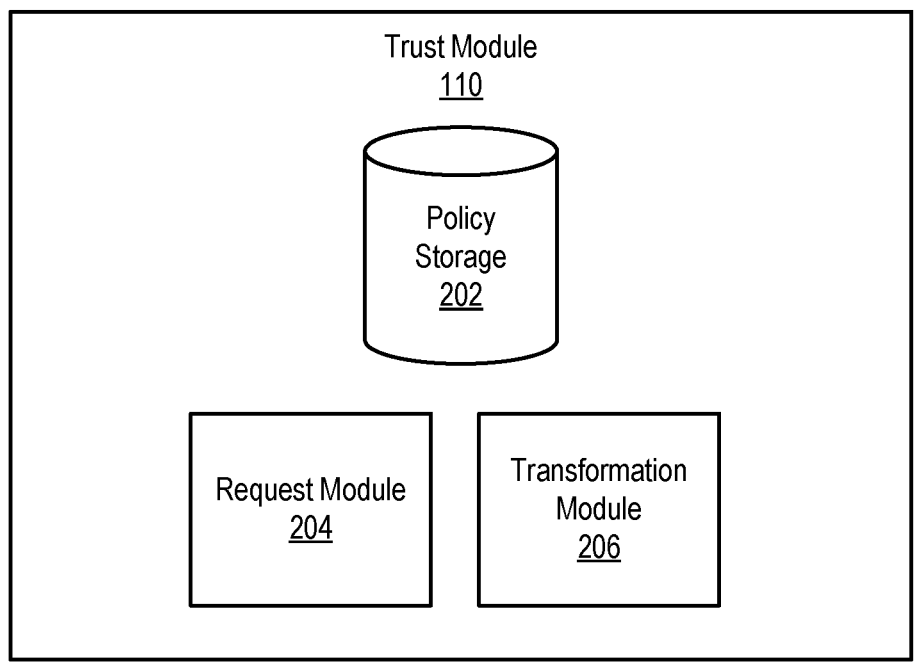
FIG. 2 is a block diagram illustrating components of a trust module according to one embodiment.

FIG. 2 is a block diagram illustrating components of the trust module 110 according to one embodiment. The trust module 110 includes a policy storage 202, a request module 204, and a transformation module 206. Those of skill in the art will recognize that other embodiments can have different and/or other components than the ones described here, and that the functionalities can be distributed among the components in a different manner.

The policy storage 202 stores policies that are applied to user data prior to being provided to administrators. A policy is information that indicates specific user data to which the policy applies and one or more transformation that are to be applied to the data. For example, a policy may indicate that the policy applies to specific types of data, such as names of users, ages of users, amounts of sales opportunities, social security numbers, phone numbers, mailing addresses, email addresses, data in a specific format, etc.

A policy may also indicate that the policy applies to user data associated with specific users. For example, a policy may include identifiers of specific users to which the policy applies or may indicate that the policy applies to users associated with a specific group or enterprise. A policy may also be associated with timing information that indicates when the policy is applicable. For example, a policy may indicate that it is only applicable during a specific time period, such as during specific months or during specific times of day. As another example, a policy may be associated with an expiration time and the policy is applicable as long as the expiration time has not expired. However, once the policy has expired, the policy can no longer be applied to user data.

A policy may further indicate administrators that are authorized to access certain user data. For example, a policy may indicate that certain user data is only accessible by administrators that are a part of a certain group or have certain rights. Additionally, a policy may indicate that certain user data not be provided to administrators. For example, a policy may indicate that certain user data not be provided because it would allow an administrator to recover the original version of the user data prior to the trust module 110 transforming the data to a representation that protected the privacy of a user.

A transformation indicated by a policy describes how user data is to be manipulated to produce a different representation of the data. The manipulation of the user data allows the user associated with the data to maintain his or her privacy. A transformation of user data may involve applying a hash function (e.g., SHA-256) to the user data. For example, a policy may indicate that a one-way hash function be applied to a social security number. The social security number is replaced with the hash value returned by the hash function. A transformation of user data may also involve mathematically manipulating the data and may involve additional user data. For example, a policy may indicate that for a user's age, an average age of multiple users in a group is determined and the user's age is replaced with the difference between user's age and the average age.

A policy may further indicate that no transformations are to be performed to certain data. For example, a policy may indicate that a user's age be transformed as described in the previous example, but that no transformations be performed to a random number that identifies the user.

In the embodiment where the service system 102 stores data for an enterprise, the policies stored in the policy storage 202 are agreed upon between the enterprise and the entity operating the service system 102. As an example, representatives of the entity may communicate with representatives of the enterprise regarding administrators having ongoing permission to access user data for purposes of improving the services offered by the service system 102. The representatives will come to an agreement as to which user data can be accessed by administrators and how the data is to be transformed prior to being accessed by the administrators. Policies are then stored in the policy storage 202 that describe what was agreed upon by the representatives.

In a typical environment where the service system 102 stores data for an enterprise, administrators have to request permission from the enterprise each time they wish to access user data. The process of requesting permission can take a prolonged period of time. However, by having policies that have been agreed upon by the enterprise, administrators are able to access user data without having to request permission each time from the enterprise. Further, based on the policies the trust module 110 ensures that administrators access user data in a way that is acceptable to the enterprise.

The request module 204 process requests by administrators for user data stored in the data storage system 108. In one embodiment, a request for user data received from an administrator is a query that includes one or more parameters for identifying the user data that the administrator is interested in. For example, a request may be for sales opportunities that closed last month of users associated with an enterprise.

In one embodiment, when the request module 204 receives a request for user data from an administrator through a client device 104, the request module 204 determines whether the user has been authenticated as being authorized to access user data. In one embodiment, the request module 204 stores authentication information (e.g., user name and password) of administrators that are authorized to access user data stored in the data storage system 108. If the administrator has not been authenticated, the request module 204 communicates with the administrator's client device 104 to request that the user provide his or her authentication information. When the administrator provides the authentication information, the request module 204 verifies that the authentication information provided matches with authentication information stored by the request module 204.

For a request for user data from an administrator, the request module 204 communicates with the data storage system 108 to identify the user data requested by the administrator. In one embodiment, the communications involve the request module 204 forwarding the request for user data to the data storage system 108 and the request module 204 receiving from the data storage system 108 the user data identified based on the request. The request module 204 provides to the transformation module 206 the user data received from the data storage system 108 so that the transformation module 206 can apply to the data any transformations that are necessary before being provided to the administrator.

The transformation module 206 transforms user data according to policies stored in the policy storage 202. When user data stored in the data storage system 108 is identified based on a request from an administrator, the transformation module 206 determines which policies stored in the policy storage 202 apply to the user data. The transformation module 206 selects the policies that apply from the multiple policies stored in the policy storage 202 based on one or more of the following factors: user associated with the data (e.g., user that created the data or has rights to the data), a type of the data, timing information, and the administrator that requested the user data.

For each policy from the policy storage 202 that applies to the user data, the transformation module 206 performs the transformations on the user data that are indicated by the policy. In performing a transformation, the transformation module 206 may retrieve additional data from the data storage system 108. For example, if a user's age is to be transformed based on an average age of a group of users, the transformation module 206 may access the data storage system 108 to identify the ages of the users of the group and then determine the average. The transformation module 206 transmits the transformed user data to the client device 104 of the administrator that requested the user data.

In one embodiment, the transformation module 206 maintains a record that tracks the administrators that have accessed user data. Each time the transformation module 206 provides user data to an administrator, the transformation module 206 adds information to the record describing the administrator's access of the data. The information added to the record may include one or more of the following: the administrator to which the data was provided, an indication of the user data provided, when the data was provided, and the policies from the policy storage 202 that were applied to the user data.

Figure 3:
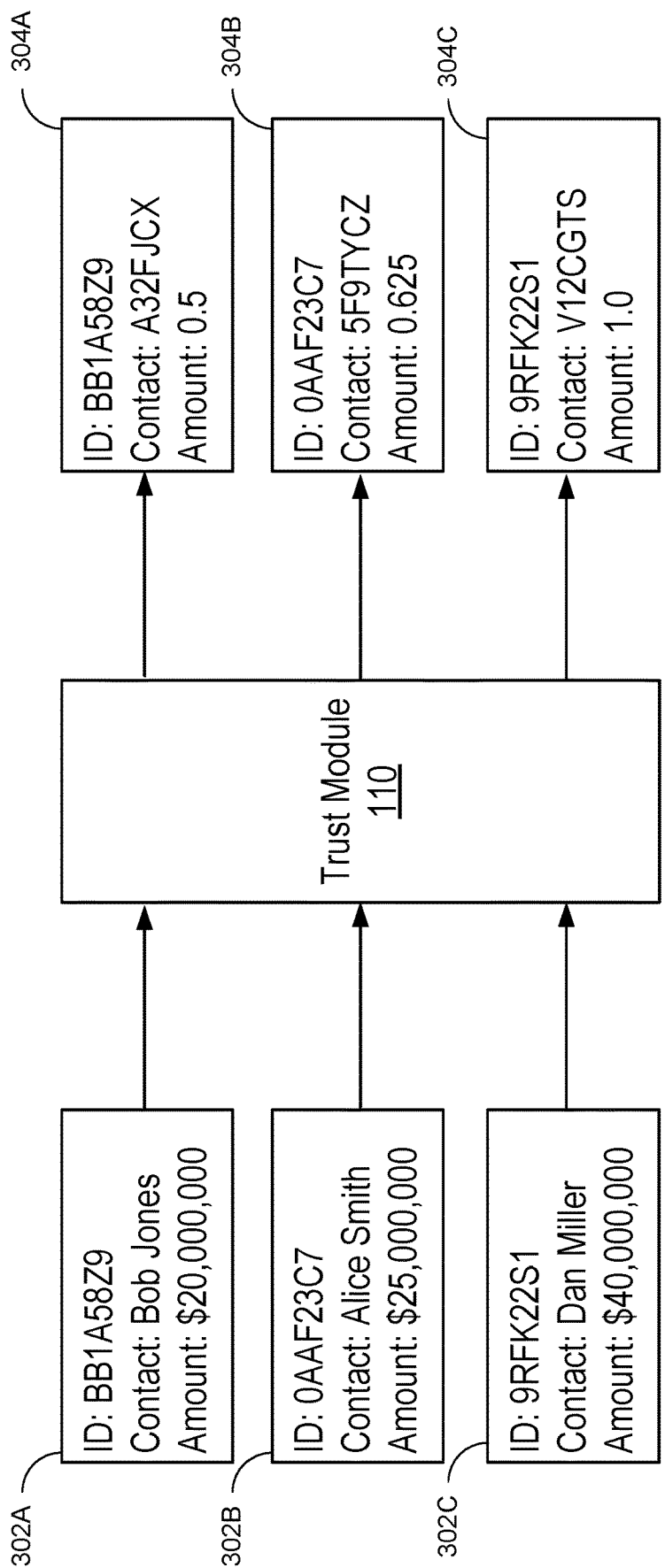
FIG. 3 is an example of transformations applied to user data according to one embodiment.

FIG. 3 illustrates an example of transformations applied to user data according to one embodiment. Assume for purposes of this example that based on a request from an administrator user data is identified that include records 302A, 302B, and 302C. The records represent sales opportunities of a salesperson that were successfully closed last month. Record 302A include identifier BB1A58Z9 which is an identifier assigned by the service system 102 to the sales opportunity. The record 302A also includes the name of the contact at the client which is Bob Jones and an amount of the sales opportunity which is $20,000,000. Record 302B includes identifier 0AAF23C7, contact Alice Smith, and an amount of $25,000,000. Record 302C include identifier 9RFK22S1, contact Dan Miller, and an amount of $40,000,000.

The trust module 110 identifies a policy that applies to contact names of sales opportunities. The policy indicates that a contact name of a sales opportunity be transformed by applying a one-way hash function to the contact name and replacing the contact name in the record with the hash value returned by the hash function. The trust module 110 identifies another policy that applies to amounts of sales opportunities. The policy indicates that the highest amount from the multiple opportunities is identified. The policy further indicates that the amount of each opportunity is replaced with the result of dividing the amount by the highest amount.

As can be seen in FIG. 3, after the trust module 110 applies the transformations indicated by the applicable policies, record 302A is transformed into record 304A, record 302B is transformed into record 304B, and record 302C is transformed to record 304C. Since no policy was identified that applies to the identifier of sales opportunities, the identifiers of the transformed records 304 are the same as those of the original records 302.

Further, each transformed record 304 includes a hash value for the contact which is the hash value output after applying a hash function to the contact of the corresponding original record 302. Hence, contact Bob Jones from record 302A has been transformed to A32FJCX in record 304A, contact Alice Smith from record 302B has been transformed to 5F9TYCZ in record 304B, and contact Dan Miller from record 302C has been transformed to V12CGTS in record 304C.

For the amount of each sales opportunity, amount $40,000,000 from record 302C was identified by the trust module 110 as the highest amount. Each transformed record 304 includes the result of dividing the amount from the corresponding original record 302 by $40,000,000. Hence, amount $20,000,000 from record 302A has been transformed to 0.5 in record 304A, amount $25,000,000 from record 302B has been transformed to 0.625 in record 304B, and amount $40,000,000 from record 302C has been transformed to 1.0 in record 304C.

The trust module 110 provides transformed records 304 to the administrator that requested the user data instead of original records 302. Based on the policies, the trust module 110 does not provide any information that would allow the administrator to determine the original contact names and amounts of records 302. For example, if the administrator requested the highest amount of the sales opportunities closed by the salesperson last month, the trust module 110 would not provide that information to the administrator because then the administrator could determine the real amounts of transformed records 304 based on that information. Hence, a policy in the policy storage 202 would indicate that the highest amount cannot be provided to administrators.

Figure 4:
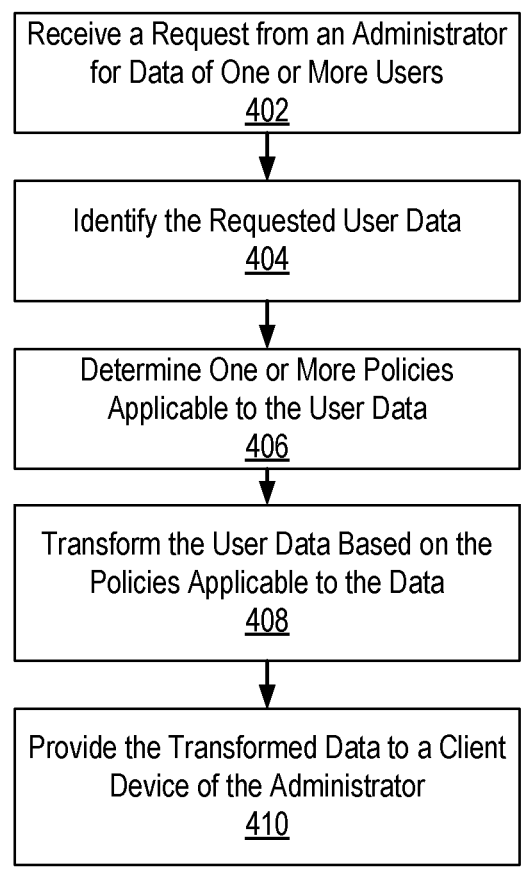
FIG. 4 is a flow chart illustrating operations of a service system in providing user data to an administrator according to one embodiment.

FIG. 4 is a flow chart illustrating operations of the service system 102 in providing user data to an administrator according to one embodiment. Those of skill in the art will recognize that other embodiments can perform the steps of FIG. 4 in different orders. Moreover, other embodiments can include different and/or additional steps than the ones described herein.

The service system 102 receives 402 a request from an administrator for data of one or more users stored in a data storage system 108. The service system 102 identifies 404 the requested user data stored in the data storage system 108. The service system 102 determines 406 one or more policies applicable to the user data.

The service system 102 transforms 408 the user data based on the policies applicable to the user data. The service system 102 provides 410 the transformed data to a client device 104 of the administrator.

Figure 5:
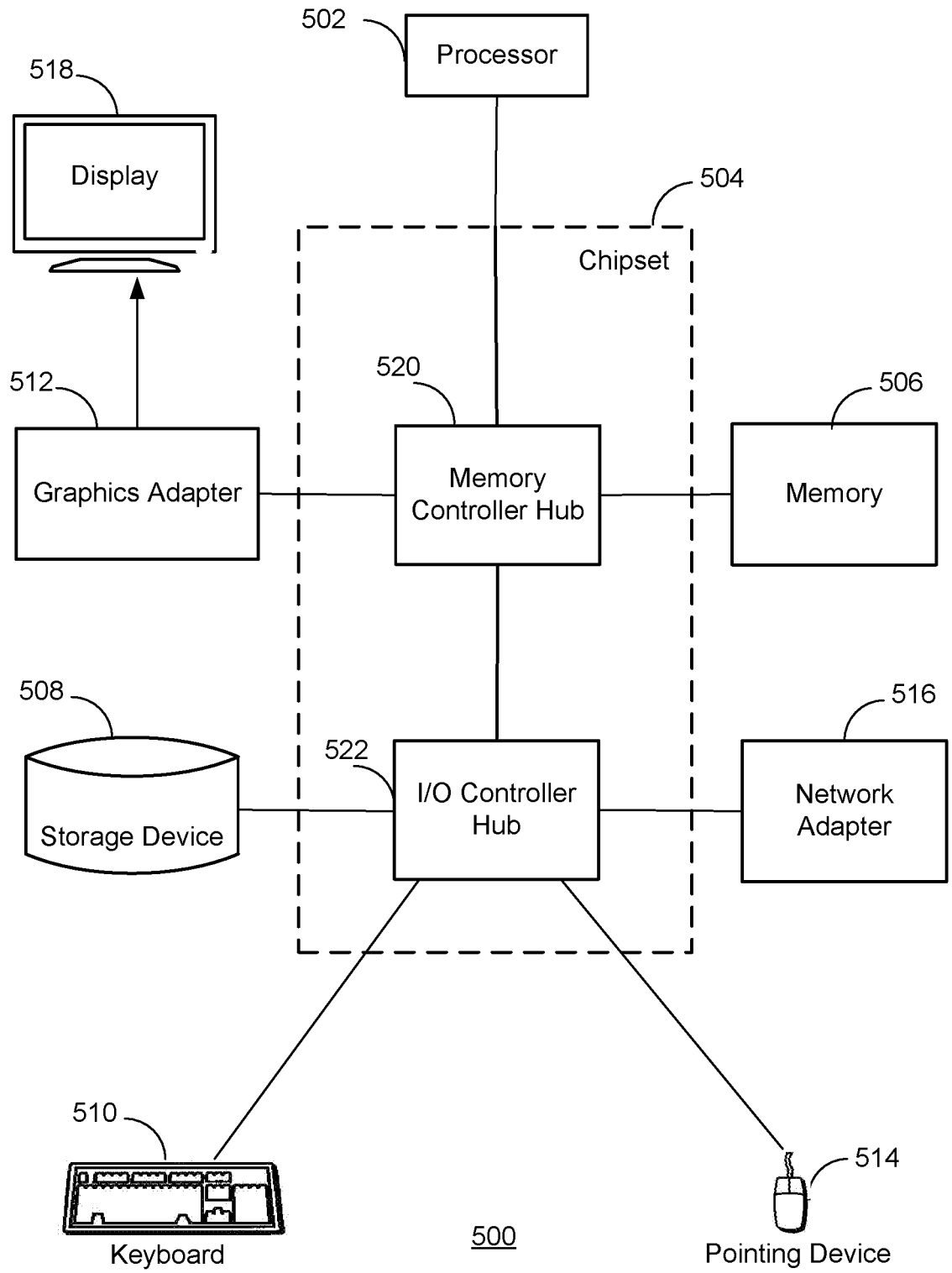
FIG. 5 is a block diagram illustrating a functional view of a typical computer system for use as one of the entities illustrated in the environment of FIG. 1 according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 200. The graphics adapter 512 displays images and other information on the display 518. The network adapter 516 couples the computer system 500 to the network 106.

As is known in the art, a computer 500 can have different and/or other components than those shown in FIG. 5. In addition, the computer 500 can lack certain illustrated components. For example, a computer system 500 acting as a service system 102 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 104 may be a mobile phone with limited processing power, a small display 518, and may lack a pointing device 514. The service system 102, in contrast, may comprise multiple blade servers working together to provide the functionality described herein.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

The invention claimed is:

1. A computer-implemented method for providing access to user data, the method comprising:
receiving, by a service database system from an administrator of the service database system, a request for user data stored in a data storage system and corresponding to a user of one or more services provided by the service database system, the request specifying a type of data to be returned to the administrator, the user data comprising a plurality of types of data including data of the specified type;
identifying and retrieving, by the service database system, from the user data, the data of the specified type;
retrieving, by the service database system, from memory, a policy applicable to the data of the specified type, the policy indicating a set of one or more users whose data may be used to transform the data of the specified type and one or more transformations to be applied to the data of the specified type;
transforming, by the service database system, the data of the specified type as indicated by the policy by:
identifying, based on parameters specified in the request, additional user data, the additional user data corresponding to an additional user of the set of one or more users whose data may be used to transform the data of the specified type, and the additional user data having a subset of data of the specified type;
retrieving the subset of data of the specified type that corresponds to the additional user; and
generating transformed user data by combining, into a single numerical value representing a statistical aggregate, the data of the specified type that corresponds to the user with the subset of data of the specified type that corresponds to the additional user; and
transmitting, by the service database system, the transformed user data to the administrator, the transmitting of the transformed user data enabling the administrator to view the single numerical value while preserving privacy of the user data.

2. The method of claim 1, wherein the service database system is prohibited from providing the administrator information that would allow recovery of the data of the specified type prior to the transformation.

3. The method of claim 2, wherein the policy or an additional policy indicates that the data of the specified type cannot be provided.

4. The method of claim 1, wherein transforming the data of the specified type comprises applying a hash function to the user data to produce the transformed user data.

5. The method of claim 1, wherein retrieving the policy applicable to the data of the specified type comprises:

selecting the policy, from a plurality of policies, based on the specified type.

6. The method of claim 1, wherein retrieving the policy applicable to the data of the specified type comprises:
selecting the policy, from a plurality of policies, based on the user associated with the user data.

7. The method of claim 1, wherein retrieving the policy applicable to the data of the specified type comprises:
selecting the policy, from a plurality of policies, based on an expiration time associated with the policy not having expired.

8. A non-transitory computer-readable storage medium storing computer-executable instructions which when executed by one or more processors cause the one or more processors to perform steps comprising:
receiving, by a service database system from an administrator of the service database system, a request for user data corresponding to a user of one or more services provided by the service database system, the request specifying a type of data to be returned to the administrator, the user data comprising a plurality of types of data including data of the specified type;
identifying and retrieving, by the service database system, from the user data, the data of the specified type;
retrieving, by the service database system, from memory, a policy applicable to the data of the specified type, the policy indicating a set of one or more users whose data may be used to transform the data of the specified type and one or more transformations to be applied to the data of the specified type;
transforming, by the service database system, the data of the specified type as indicated by the policy by:
identifying, based on parameters specified in the request, additional user data, the additional user data corresponding to an additional user of the set of one or more users whose data may be used to transform the data of the specified type, and the additional user data having a subset of data of the specified type;
retrieving the subset of data of the specified type that corresponds to the additional user; and
generating transformed user data by combining, into a single numerical value representing a statistical aggregate, the data of the specified type that corresponds to the user with the subset of data of the specified type that corresponds to the additional user; and
transmitting, by the service database system, the transformed user data to the administrator, the transmitting of the transformed user data enabling the administrator to view the single numerical value while preserving the privacy of the user data.

9. The computer-readable storage medium of claim 8, wherein the service database system is prohibited from providing the administrator information that would allow recovery of the data of the specified type prior to the transformation.

10. The computer-readable storage medium of claim 9, wherein the policy or an additional policy indicates that the data of the specified type cannot be provided.

11. The computer-readable storage medium of claim 8, wherein transforming the user data comprises applying a hash function to the data of the specified type to produce the transformed user data.

12. The computer-readable storage medium of claim 8, wherein retrieving the policy applicable to the data of the specified type comprises:
selecting the policy, from a plurality of policies, based on the specified type.

13. The computer-readable storage medium of claim 8, wherein retrieving the policy applicable to the data of the specified type comprises:
selecting the policy, from a plurality of policies, based on the user associated with the user data.

14. The computer-readable storage medium of claim 8, wherein retrieving the policy applicable to the data of the specified type comprises:
selecting the policy, from a plurality of policies, based on an expiration time associated with the policy not having expired.

15. A computer system comprising:
one or more processors; and
a non-transitory computer-readable storage medium storing computer-executable instructions which when executed by the one or more processors cause the one or more processors to perform steps comprising:
receiving, by a service database system from an administrator of the service database system, a request for user data corresponding to a user of one or more services provided by the service database system, the request specifying a type of data to be returned to the administrator, the user data comprising a plurality of types of data including data of the specified type;
identifying and retrieving, by the service database system, from the user data, the data of the specified type;
retrieving, by the service database system, from memory, a policy indicating a set of one or more users whose data may be used to transform the data of the specified type and one or more transformations to be applied to the data of the specified type;
transforming, by the service database system, the data of the specified type as indicated by the policy by:
identifying, based on parameters specified in the request, additional user data, the additional user data corresponding to an additional user of the set of one or more users whose data may be used to transform the data of the specified type, and the additional user data having a subset of data of the specified type;
retrieving the subset of data of the specified type that corresponds to the additional user; and
generating transformed user data by combining, into a single numerical value representing a statistical aggregate, the data of the specified type that corresponds to the user with the subset of data of the specified type that corresponds to the additional user; and
transmitting, by the service database system, the transformed user data to the administrator, the transmitting of the transformed user data enabling the administrator to view the single numerical value while preserving privacy of the user data.

* * * * *

UNITED STATES PATENT AND TRADEMARK OFFICE
CERTIFICATE OF CORRECTION

PATENT NO. : 11,314,688 B2
APPLICATION NO. : 15/339344
DATED : April 26, 2022
INVENTOR(S) : Pascale et al.

It is certified that error appears in the above-identified patent and that said Letters Patent is hereby corrected as shown below:

In the Claims

In Column 11, in Claim 8, Line 50, after "preserving" delete "the".

Signed and Sealed this
Eleventh Day of October, 2022

Katherine Kelly Vidal
*Director of the United States Patent and Trademark Office*